F. H. RELPH.
Apparatus for Bagging Grain.
No. 200,342. Patented Feb. 12, 1878.
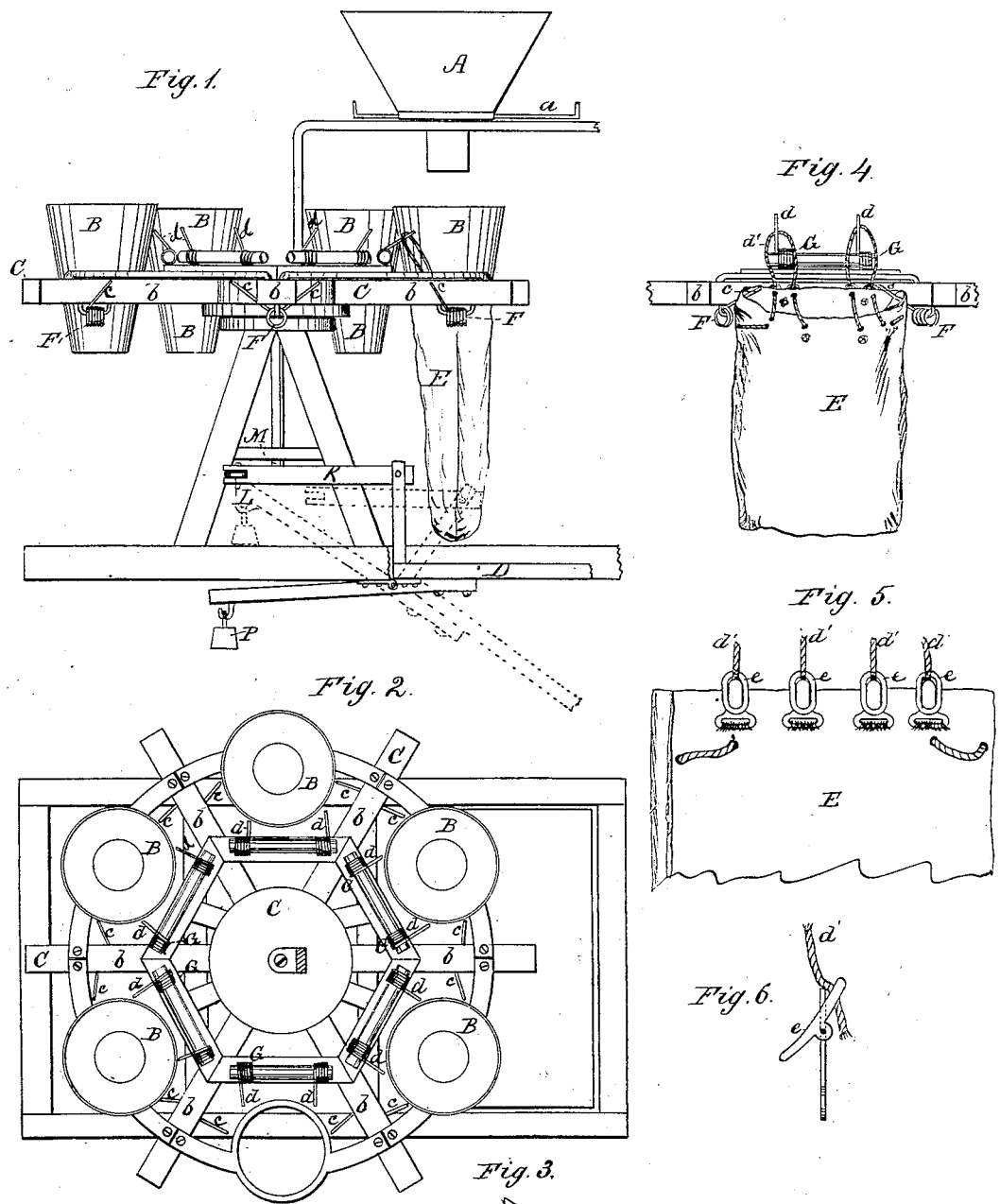

UNITED STATES PATENT OFFICE.

FRANCIS H. RELPH, OF NEW YORK, N. Y., ASSIGNOR TO HIMSELF AND ANDREW M. UNDERHILL, OF SAME PLACE.

IMPROVEMENT IN APPARATUS FOR BAGGING GRAIN.

Specification forming part of Letters Patent No. 200,342, dated February 12, 1878; application filed October 15, 1877.

*To all whom it may concern:*

Be it known that I, FRANCIS HERON RELPH, of New York, in the county and State of New York, have invented a new and useful Improvement in Machinery for Bagging Grain and Automatically Fastening the Bags, which improvement is fully set forth in the following specification and the accompanying drawings, in which—

Figure 1 is a side elevation of the apparatus. Fig. 2 is a plan view. Fig. 3 is a detail view of the ratchet mechanism. Fig. 4 represents the manner of attaching the bags to the spring-hooks. Figs. 5 and 6 show the application and operation of the bag-fastening devices.

The object of the invention is to produce an improved apparatus for bagging grain. The chief element of the apparatus is a horizontal intermittingly-rotating frame carrying the bags to be filled, and also funnels or tubes for guiding the grain into the bags as the rotating frame brings them successively beneath the discharge-spout of a hopper or grain-receiver. When filled, the weight of their contents causes the release of the bags from their suspending-hooks, and at the same time closes the mouth of each bag by tension on a cord attached thereto. The bag-carrying frame is intermittingly rotated by means of a hinged trap and a ratchet mechanism. Each bag, as it is filled, falls upon and tilts the trap, which thereby rotates the frame sufficiently to bring the next empty bag under the discharge-spout.

The principal parts of the apparatus are the fixed hopper or receiver A, from which the grain is allowed to discharge into the bags, the funnels or guide-tubes B, the horizontal rotating frame C, the trap D, ratchet mechanism M, and bag-suspending and cord-tension hooks or springs $c$ $d$.

The hopper or grain-receiver A has an apertured slide, $a$, which regulates the discharge. The funnels B are supported vertically between the radial arms $b$ of the frame C, and as the latter rotates they pass successively under the spout of the receiver, where they are arrested until the bags E have been filled. The latter are suspended beneath the funnels by means of wire hooks or arms $c$, which form the termini of spiral springs F that are attached to the radial arms $b$. The hooks or arms $c$ extend upward and inward from the radial arms of the frame, and pierce the upper ends of the bags, thus holding them open to receive the grain discharged through the funnels B.

The bags are provided with cords $d'$ and buckles $e$, for closing them automatically when filled, as will be presently described. When the bags are suspended from the spring-hooks $c$ the loops of the cords $d'$ are passed over the projecting wires $d$, which are the termini of spiral or coiled springs G, attached to bars that connect the radial arms $b$ of the rotating frame.

The trap D is a pivoted door or floor section, which opens or falls automatically. This trap is connected by a rod, K, with an arm or lever-pawl, L, that acts on the ratchet M, the latter being fast on the shaft of the rotating frame C.

From the foregoing description it will be apparent that, the required number of bags having been attached beneath the funnels and the slide of the receiver properly adjusted, the grain will discharge into the funnel located under the receiver, and thereby into the bag attached beneath said funnel. When the bag is full, the weight of the grain therein will cause it to depress and slide or draw off from the spring-hooks $c$ $c$, and as it does so it falls upon the trap D, which tilts and allows the bag to pass off the same down the chute into the ship's hold. When the bag slides off the hooks $c$ $c$ the cords $d'$ are drawn through the buckles $e$, and as the trap D tilts the weight of the bag draws the cords tight before the resistance of the spring-hooks $d$ is overcome, and the loops are released from the hooks. When the trap tilts, the ratchet mechanism M rotates the frame C sufficiently to bring another funnel and bag under the discharge-spout of the receiver A, and so soon as the bag has passed off the trap the latter is raised again into horizontal position by the operation of the weight P, and thus the operation of filling bags and the delivery of filled bags goes on automatically, as before.

I may in some cases employ a pivoted lever-catch, operated by hand, to support the free end of the tilting trap; but I prefer the automatic arrangement.

The cords $d'$ are rove through eyelets in the upper ends of the bags, and pass through the frames of buckles $e$, which are attached to one side of the bags, near the mouth, and have broad pivoted tongues that will automatically bite or clamp the cords when the latter, having been first drawn taut by tension on the hooks $d$, are subjected to tension by expansion of the full bags. The manner of roving the cords is fully shown in Figs. 4 and 5.

What I claim is—

1. A horizontal frame pivoted in such manner as to rotate, and having radial arms provided with spring-hooks for supporting the bags to be filled and for drawing taut the cords that close the mouths of the bags, and the funnels or guide-tubes located between the radial arms, all combined as shown and described.

2. The combination of the tilting weighted trap, the connecting-rod and ratchet mechanism, and the rotating frame, as shown and described.

3. The springs having projecting ends, in combination with the spring arms or hooks, as shown and described.

4. The wire springs attached to the frame, and having ends $c$ projecting in an upward direction, for the purpose of piercing the bags and supporting them until the weight of their contents overcomes the tension of the springs, as shown and described.

5. In combination with the spring-hooks $c\ c$ and $d\ d$, the bag and its attached buckles and cords, as shown and described.

F. H. RELPH.

Witnesses:
MORRIS D. C. ANDRADE,
J. W. HARTZ.